United States Patent
Van Leth

(10) Patent No.: US 6,566,811 B1
(45) Date of Patent: May 20, 2003

(54) PICTURE DISPLAY DEVICE

(75) Inventor: Nicolaas Joseph Martin Van Leth, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 253 days.

(21) Appl. No.: 09/656,830

(22) Filed: Sep. 7, 2000

(51) Int. Cl.⁷ .................................................. H01J 17/49
(52) U.S. Cl. ...................................... 313/583; 313/630
(58) Field of Search ................................. 313/582, 583, 313/584, 585, 586, 587, 630

(56) References Cited

U.S. PATENT DOCUMENTS

| | | | |
|---|---|---|---|
| 4,599,076 A | * | 7/1986 | Yokono et al. ......... 313/630 X |
| 5,764,001 A | * | 6/1998 | Kahn et al. ................. 313/582 |
| 5,783,906 A | * | 7/1998 | Moore et al. ............... 313/586 |
| 5,808,413 A | * | 9/1998 | Bongaerts et al. .......... 313/582 |
| 5,956,002 A | * | 9/1999 | Martin et al. ................. 345/60 |
| 6,052,160 A | * | 4/2000 | Bohmer et al. ......... 313/583 X |
| 6,169,364 B1 | * | 1/2001 | Van Slooten et al. ....... 313/582 |

FOREIGN PATENT DOCUMENTS

| | | | |
|---|---|---|---|
| JP | 4-39836 | * | 2/1992 |
| JP | 11-237615 | * | 8/1999 |
| WO | WO9904408 | | 1/1999 ............ H01J/17/06 |

\* cited by examiner

Primary Examiner—Fred L. Braun
(74) Attorney, Agent, or Firm—Aaron Waxler

(57) ABSTRACT

The adhesion of a sputter-resistant layer is improved by providing the layer with a fairly high quantity of glass frit, in which the frit and the sputter-resistant material have a mass ratio $M_{frit}/M_{srm}$ of 0.9 or more.

9 Claims, 2 Drawing Sheets

PICTURE DISPLAY DEVICE

BACKGROUND OF THE INVENTION

The invention relates to a picture display device comprising at least one compartment containing an ionizable gas, in which walls of the compartment are provided with electrodes for selectively generating a plasma discharge of the ionizable gas during operation, and an electro-optical layer of a material having an optical property which is dependent on the discharge state of the plasma discharge.

Picture display devices for displaying monochromatic or color images comprise, inter alia, plasma-addressed liquid crystal display devices, referred to as PALC displays, and (DC) plasma display panels (PDPs). The PALC displays and PDPs are used as television and computer displays and are preferably of the flat-panel type.

SUMMARY OF THE INVENTION

A picture display device of the type described in the opening paragraph is known from PCT patent application WO-A-99/04408 (PHN 16458). The flat-panel picture display device described in this document comprises a display screen having a pattern of (identical) data storage or display elements and a multitude of compartments. The compartments are filled with an ionizable gas and provided with electrodes for (selectively) ionizing the ionizable gas during operation. In the known picture display device, the compartments have the shape of parallel, elongate channels (formed in a channel plate) which function as selection means for the picture display device (the plasma-addressed row electrodes). By applying a DC voltage difference across the electrodes in one of the channels of the channel plate, electrons are emitted (from the cathode) which ionize the ionizable gas, thereby forming a plasma (plasma discharge). When the voltage across the electrodes in one channel is switched off and the gas is de-ionized, a subsequent channel is switched on. On the display screen side of the picture display device, the compartments are closed by a (thin) dielectric layer ("microsheet"). The picture display device further comprises a layer of an electro-optical material provided between the channel plate and a substrate provided with further electrodes which function as the data electrodes or column electrodes of the picture display device. The picture display device is formed by the assembly of the channel plate with the electrodes and the ionizable gas, the dielectric layer, the layer of the electro-optical material and the substrate with the further electrodes.

In the known picture display device, the light transmissibility of the electro-optical layer is determined, during operation, by the plasma, discharge (also dependent on the voltage at the column electrodes).

In a plasma display panel, a plasma discharge is used to directly excite a layer comprising electroluminescent phosphors of display elements, in which (electrons of) the ionized gas in the compartment itself excite(s) the phosphors. In an alternative embodiment of a plasma display panel, a plasma discharge is used to generate light (for example, UV light) in which the light excites a layer comprising photoluminescent phosphors of display elements.

In the known display device, the energy consumption of such picture display devices is reduced by providing at least one of the electrodes with a layer comprising particles of a sputter-resistant material.

Since a (DC) plasma discharge is used in the picture display device, the electrodes in the compartment are subject to an ion bombardment and, generally, the electrodes are made of a sputter-resistant material, or the electrodes are preferably provided with a sputter-resistant layer. The use of sputter-resistant material increases the resistance of the electrodes against sputtering. In said patent application, at least one of the electrodes is provided with such a layer comprising (macroscopic) particles of a sputter-resistant material or "refractory material".

Practice has proved that such a layer comprising a sputter-resistant material generally adheres poorly to the electrodes. It is an object of the present invention to obviate this drawback.

To this end, a picture display device according to the invention is characterized in that at least one of the electrodes is provided with a layer comprising sputter-resistant material and a frit, in which the frit and the sputter-resistant material have a mass ratio $M_{frit}/M_{srm}$ of at least 0.9, in which $M_{frit}$ and $M_{srm}$ represent the mass of frit and the mass of sputter-resistant material, respectively, per surface unit.

The mass ratio $M_{frit}/M_{srm}$ is preferably at least 1 or more. It has been found that very satisfactorily adhesive layers can be obtained with these ratios. At a mass ratio from about 3.5, however, the generated plasma is unstable.

Sputter-resistant material suitable for the purpose of the invention comprises rare earth borides, for example $LaB_6$ or $GdB_6$, or ruthenium oxide ($RuO_2$).

The sputter-resistant material can be prepared with the frit which is, for example, a glass frit in the suitable mixing ratio and subsequently provided on the electrodes.

In an alternative embodiment according to the invention, the layer of sputter-resistant material is provided on a (glass) frit on (at least one of) the electrodes. By manufacturing the layer in two steps, parts of the sputter-resistant material fill pores of the (glass) frit layer. In this respect it is to be noted that WO-A-99/04408 (PHN 16458) already states the possibility of improving the adhesion of the layer by adding very finely ground glass frit (typical grain size $\leq 1$ $\mu$m) to the particles of the sputter-resistant material. In contrast to the present invention, a small quantity of frit is chosen in the method described in this document, because the presence of frit particles generally does not lead to a reduction of the effective surface of the sputter-resistant material, which is undesirable for a maximal secondary emission coefficient of the layer of sputter-resistant material.

BRIEF DESCRIPTION OF THE DRAWINGS

These and other aspects of the invention are apparent from and will be elucidated with reference to the embodiments described hereinafter.

In the drawings:

FIG. 2 is a schematic, perspective view, partly broken away, of a part of a construction of a plasma-addressed liquid crystal picture display device (PALC), while

The Figures are purely schematic and not drawn to scale. Particularly for the sake of clarity, some dimensions are strongly exaggerated. In the Figures, similar components re denoted, wherever possible, by the same reference numerals.

DESCRIPTION OF THE PREFERRED EMBODIMENTS

Figure 1:
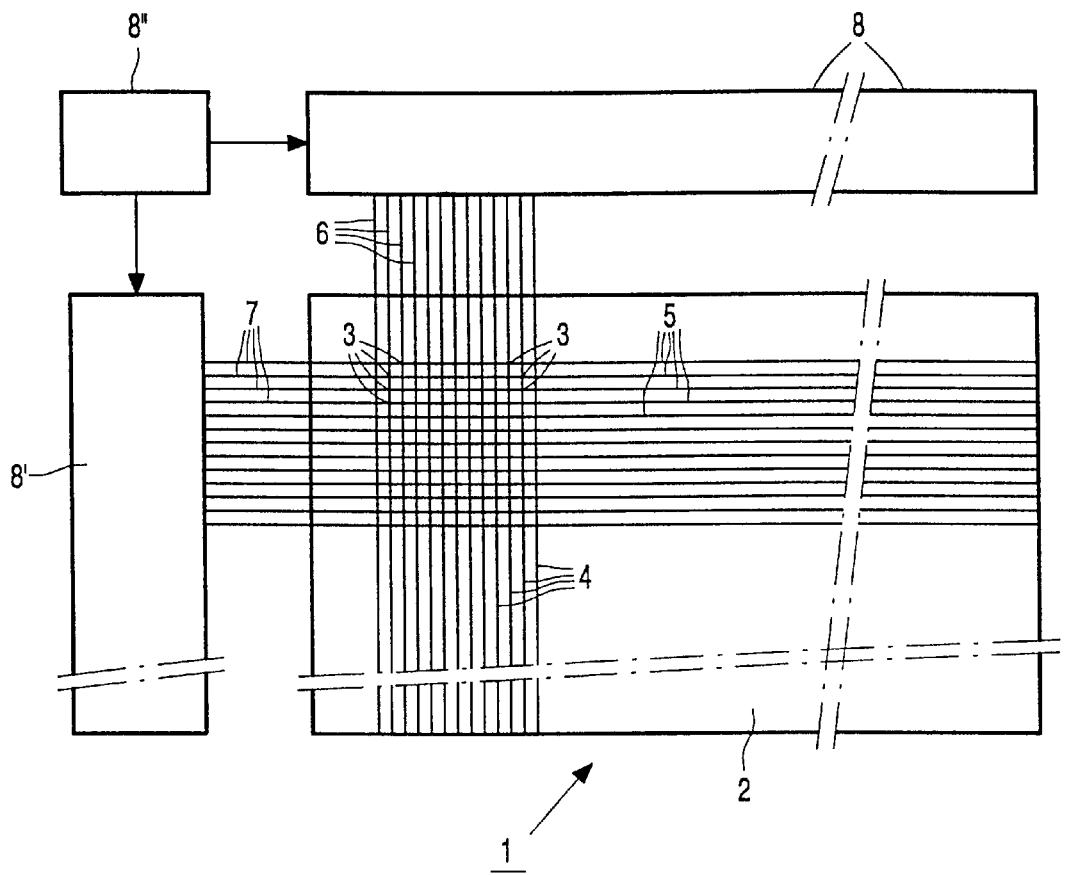
FIG. 1 is a schematic block diagram of a picture display device.

FIG. 1 shows very schematically a block diagram of a picture display device. The picture display device 1 comprises a pattern 2 of pixels which are separated from each other in the vertical and horizontal directions (at predetermined distances). Each pixel 3 comprises overlapping portions of (thin, narrow) electrodes 4 of a group of electrodes provided in vertical columns, and (thin, narrow) electrodes 5 of a further group of electrodes provided in horizontal rows. The electrodes 4 of the group of electrodes are also referred to as column electrodes, and the electrodes 5 of the further group of electrodes are also referred to as row electrodes. In a plasma-addressed liquid crystal display device (PALC), the rows are formed by long, narrow channels (the compartments). The pixels 3 in each row of electrodes (channels) 5 represent one data line.

The width of the electrodes 4, 5 determines the dimensions of the pixels 3 which have a typically rectangular shape. Electrodes 4 receive (analog) drive signals "(data drive signals)" from a drive circuit 8 via conductors 6, and electrodes 5 receive (analog) drive signals "(data drive signals)" from a drive circuit 8' via conductors 7.

To produce an image or a data graphic display on a relevant area of the surface 2, the picture display device employs a control circuit 8" "(scan control circuit)" which controls the drive circuits 8, 8'. In the picture display device, various types of electro-optical materials may be used. Examples of electro-optical materials are (twisted) nematic or ferroelectric liquid crystal materials. In general, the electro-optical materials weaken the transmitted or reflected light in dependence upon a voltage applied across the material.

Figure 2:
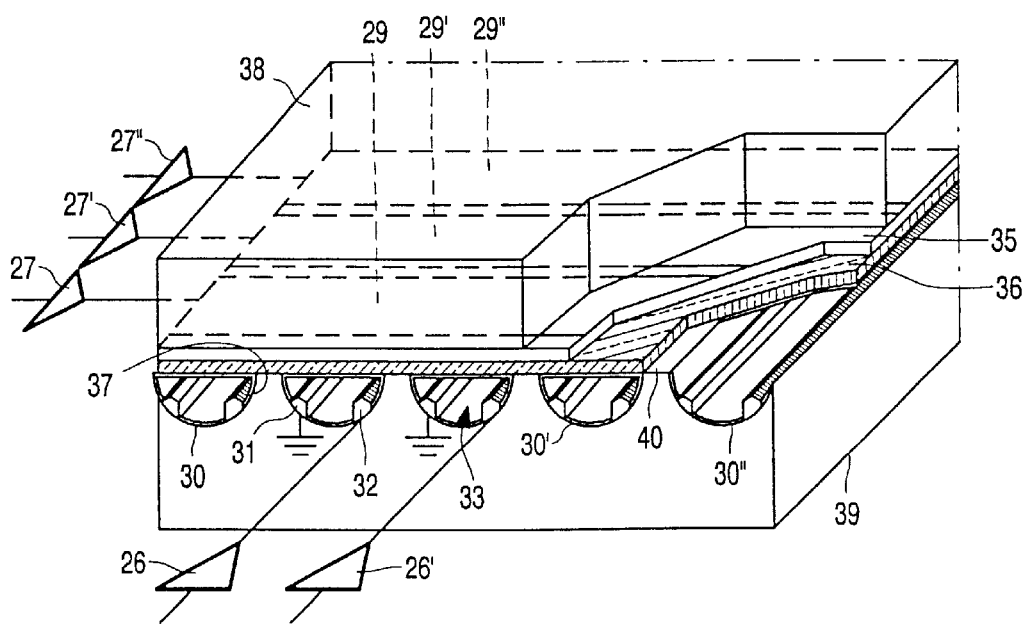

FIG. 2 is a schematic, perspective view, partly broken away, of a part of a construction of a plasma-addressed liquid crystal display device (PALC) comprising a first substrate 38 and a second substrate 39. In FIG. 2, only three column electrodes 29, 29', 29" are shown. The row electrodes 30, 30', 30", which function as selection means, are formed by a plurality of parallel, elongate channels (compartments) below an electro-optical layer 35 of an electro-optical material. The panel is provided with electric connections to the column electrodes 29, 29', 29" and the plasma electrodes 31, 32, the column electrodes 29, 29', 29" receiving (analog) drive signals from output amplifiers 27, 27', 27", and the anode electrodes 32 in the (plasma) channels 30, 30', 30" receiving drive signals from output amplifiers 26, 26'. Each (plasma) channel 30, 30', 30" is filled with an ionizable gas 33 and is sealed with a thin dielectric layer "(microsheet)" 36 which is made of, for example, glass. Each compartment (the channels) is provided at an inner surface (wall) with first and second elongate electrodes 31, 32 extending throughout the length of the channel. The second electrode 32 is referred to as the anode and is fed with a pulsed voltage, a so-called "strobe pulse", causing electrons emitted from the cathode 31 to ionize the gas, thereby forming a plasma. In an alternative embodiment, a negative (DC) pulse is applied to the cathode. The next channel is not energized until after the "strobe pulse" has ended and the gas has been de-ionized.

At least one of the electrodes 31, 32 is provided with a layer 37 comprising frit, in this example glass frit and a sputter-resistant material (or "refractory material") with a mass ratio $M_{frit}/M_{srm}$ of at least 0.9 of the frit and the sputter-resistant material. $M_{frit}$ and $M_{srm}$ are the mass of frit and the mass of sputter-resistant material, respectively, per surface unit. In this example, the material $LaB_6$ is chosen as a sputter-resistant material.

By adding (glass) frit to a sufficient extent, the adhesion of the layer 37 is greatly improved. This will be further elucidated with reference to FIG. 3. To test the extent of adhesion, a concentrated solution of $LaB_6$ particles having an average particle size of, for example, about 1.5 $\mu$m ($d_{50}$=1.46 $\mu$m) is mixed with a concentrated solution of frit particles having an average particle size of, for example, about 0.9 $\mu$m ($d_{50}$=0.88 $\mu$m) so that a given mass ratio $M_{frit}/M_{srm}$ of the frit and the sputter-resistant material was obtained in the ultimate material. After the various layers had been provided, they were subjected to a firing treatment (preglazing) at 460° C. for one hour.

Figure 3:
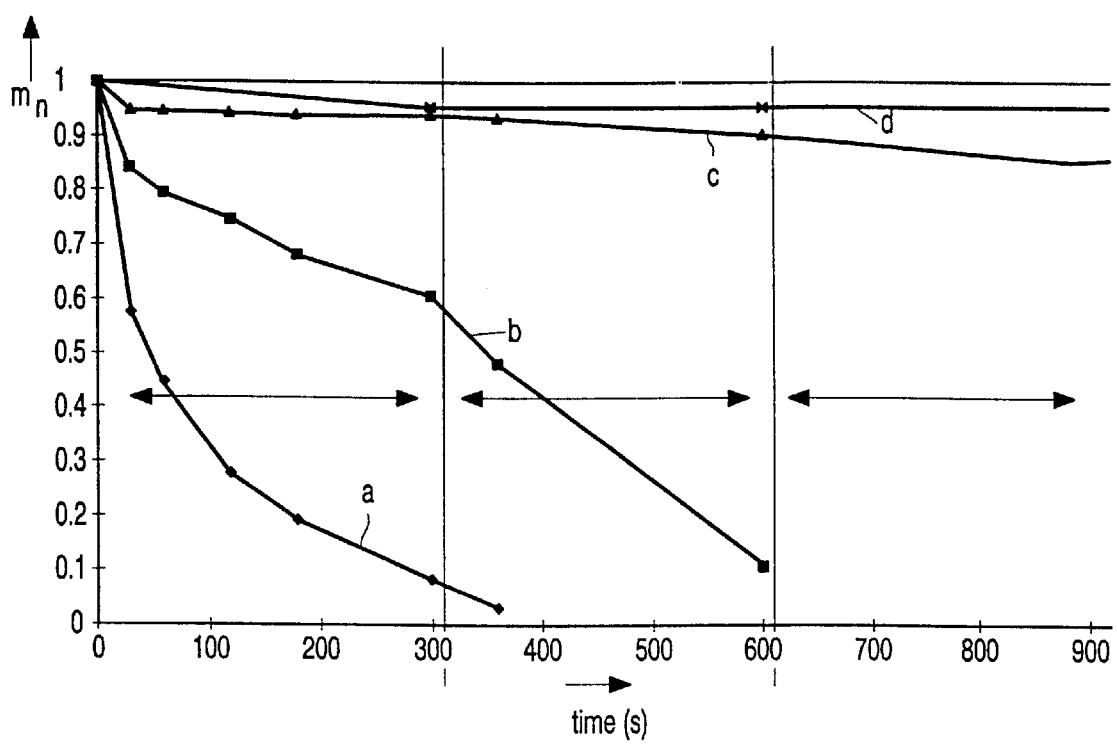
FIG. 3 shows the adhesion behavior for layers having a different mass ratio $M_{frit}/M_{srm}$ of the frit and the sputter-resistant material.

FIG. 3 shows how the adhesion of the layers was tested. During the first 300 seconds, the layers were subjected to an ultrasonic treatment (resonance frequency 47 kHz), subsequently for 300 seconds to a combination of an ultrasonic treatment and degassing. Subsequently the layers were subjected to a brushing treatment, in which the brushing pressure increased gradually.

FIG. 3 shows the results for layers having a mass ratio $M_{frit}/M_{srm}$ of 0 (curve a, no frit), 1/3 (curve b), 1 (curve c) and 3 (curve d), respectively. The normalized mass $m_n$=m(t)/m(t=0) is plotted on the ordinate. The Figure clearly shows that there is hardly any loss of mass (at most 15%) at higher values of $M_{frit}/M_{srm}$. Further loss of mass hardly occurred, even after repeated brushing.

Figure 4:
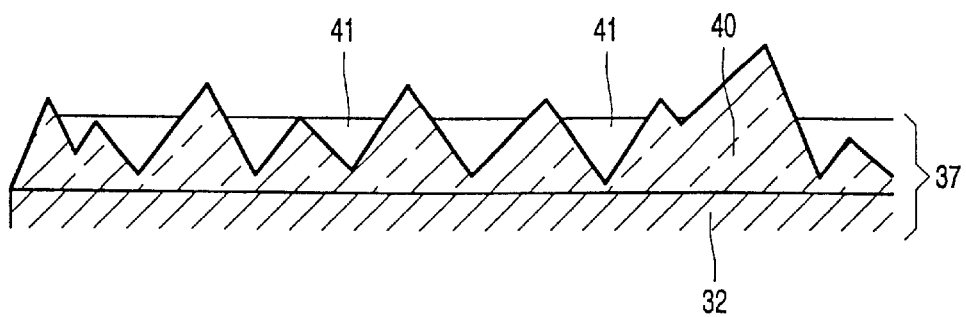
FIG. 4 is a cross-section of such a layer.

FIG. 4 shows an embodiment in which the layer 37 was manufactured in two steps. First, a layer 40 of (glass) frit was deposited (from a concentrated solution of frit particles having an average particle size of, for example, 18 $\mu$m ($d_{50}$=18 $\mu$m)). This layer is porous. The pores of the layers were subsequently filled with $LaB_6$. A sufficient quantity of $LaB_6$ (41) for filling the pores was provided from a concentrated solution of $LaB_6$ particles having an average particle size of, for example, about 1.5 $\mu$m ($d_{50}$=1.46 $\mu$m). In a typical example, the mass ratio $M_{frit}/M_{srm}$ was 3/2. Here again, a good adhesion was obtained as appeared from tests similar to those described above.

In summary, the invention relates to an improvement of the adhesion of an anti-sputter layer of frit and a sputter-resistant material on the electrodes of a plasma discharge space, which is obtained by a relatively high quantity of frit in the layer (substantially the same mass or more).

The invention resides in each and every novel characteristic feature and each and every combination of characteristic features.

What is claimed is:

1. A picture display device comprising at least one compartment containing an ionizable gas, in which walls of said at least one compartment are provided with electrodes for selectively generating plasma discharge of said ionizable gas during operation, and an electro-optical layer of a material having an optical property which is dependent on a discharge state of said plasma discharge, wherein at least one of said electrodes is provided with a layer comprising sputter-resistant material and a frit, in which said frit and said sputter-resistant material have a mass ratio $M_{frit}/M_{srm}$ of at least 1, in which $M_{frit}$ and $M_{srm}$ represent the mass of frit and the mass of sputter-resistant material, respectively, per surface unit.

2. The picture display device of claim 1, wherein said frit and said sputter-resistant material have a mass ratio $M_{frit}/M_{srm}$ of less than 3.5.

3. The picture display device of claim 1, wherein said sputter-resistant material has a rare earth boride or ruthenium oxide.

4. The picture display device of claim 1, wherein said boride is $LaB_6$.

5. The picture display device of claim 1, wherein said layer has a porous frit whose pores are filled with the sputter-resistant material.

6. The picture display device of claim 1, wherein said frit is a glass frit.

7. The picture display device of claim 1, wherein said electro-optical layer has a layer of an electro-optical material, and in that said picture display is provided with means which are suitable for activating said electro-optical layer.

8. The picture display device of claim 1, wherein said electro-optical material has a liquid crystal material.

9. The picture display device of claim 1, wherein said liquid crystal material of said electro-optical layer has electroluminescent or photoluminescent phosphors.

* * * * *